(12) United States Patent
Khello et al.

(10) Patent No.: US 6,611,584 B1
(45) Date of Patent: Aug. 26, 2003

(54) METHOD AND A SYSTEM FOR USE IN A TELECOMMUNICATIONS NETWORK

(75) Inventors: Robert Khello, Norsborg (SE); Leslie Graf, Melbourne (AU); Rune Boman, Haninge (SE); Pieter Veenstra, Den Haag (NL)

(73) Assignees: Telefonaktiebolaget LM Ericsson, Stockholm (SE); Telia AB, Farsta (SE); Koninklyke PTT Nederland N.V. respectively (NL)

( * ) Notice: Subject to any disclaimer, the term of this patent is extended or adjusted under 35 U.S.C. 154(b) by 0 days.

(21) Appl. No.: 09/427,440

(22) Filed: Oct. 26, 1999

Related U.S. Application Data

(63) Continuation of application No. PCT/SE98/00701, filed on Apr. 17, 1998.

(30) Foreign Application Priority Data

Apr. 30, 1997 (SE) .............................................. 9701642

(51) Int. Cl.⁷ .............................. H04M 3/42; H04M 7/00
(52) U.S. Cl. .................................. 379/201.03; 379/219
(58) Field of Search ...................... 379/201.01, 201.02, 379/201.03, 207.02, 219, 220.01, 229

(56) References Cited

U.S. PATENT DOCUMENTS 5,430,719 A   7/1995  Weisser, Jr. ................. 370/389
5,572,579 A   11/1996 Orriss et al. ............ 379/142.01
5,602,909 A   2/1997  Carkner et al. ......... 379/221.13

FOREIGN PATENT DOCUMENTS

SE   504 405 C2   2/1997
WO   94/29993     12/1994

*Primary Examiner*—Benny Q. Tieu
(74) *Attorney, Agent, or Firm*—Nixon & Vanderhye P.C.

(57) ABSTRACT

In a telecommunication network a subscriber connected to an originating local exchange requests activation of a supplementary service. The supplementary service establishes an end-to-end TC-dialogue with a corresponding supplementary service of a destination local exchange. The TC-dialogue terminates the request on an interfering telecommunication service in an intermediate node. For preventing service operation failure in case of interaction between the supplementary service and the interfering telecommunication service, a relay link is established between an incoming TC-dialogue and an outgoing TC-dialogue at the intermediate node to realize a chain of end-to-end TC-dialogues between the originating exchange and the destination exchange, while using a transparent relay functionality independent of utilizing TCAP based supplementary service ASEs as intermediate nodes. The handling and continuity of the chained dialogues is differentiated based on the effect of the interaction caused by the interfering telecommunication service.

32 Claims, 7 Drawing Sheets

METHOD AND A SYSTEM FOR USE IN A TELECOMMUNICATIONS NETWORK

This is a continuation of PCT application No. PCT/SE98/00701, filed Apr. 17 1998, the entire content of which is hereby incorporated by reference in this application.

TECHNICAL FIELD OF THE INVENTION

The present invention relates to a method and system for use in a telecommunication network, in which a subscriber connected to an originating local exchange node has requested activation of a supplementary service located in an application of said originating node. The supplementary service uses a Transaction Capability Application Part TCAP and a corresponding Abstract Service Element ASE for establishing an end-to-end Transaction Capability TC-dialogue with a corresponding supplementary service in an application of a destination local exchange node to which an addressed remote subscriber is connected. The TC-dialogue terminates the request on an interfering telecommunication service located in an application of an intermediate node.

DESCRIPTION OF RELATED ART

A telecommunication network is used to be regarded as consisting of a hierarchy of three levels, viz. a local level including local exchanges, a transit level including transit exchanges and a gateways level including international exchanges and gateways.

A number of telecommunication services, e.g. the services "freephone" and "routing function", are realized in nodes located above the local level, e.g. the transit level. For these specific calls, the received address information, e.g. dialled number, always identifies the service being located at the intermediate node. These services realized above the local level perform a number translation and the call is thereafter rerouted towards a destination being addressed by the translated number. Depending on the application being requested, the number translation may be repeated until the call is terminated towards a user, i.e. a subscriber, in the terminating network entity.

Additionally, the telecommunication service number portability, which implies that a user keeps his number identity when changing operator or geographical location, requires modification of routing information for terminating calls towards addressed users. For these calls, the received address information, e.g. dialled number, always identifies the local exchange to which the user was connected prior to his new subscription profile, thus being a new geographical location.

The function "Transaction Capability Application Part" TCAP, also just referred to as "Transaction Capability" TC, is a component of SS No. 7 used to packet information from a user in a structured way and establishes an end-to-end dialogue with the remote user. The detailed specification for the operative procedures, the coding and the formatting of the TCAP and TC-dialogues are described in the ITU-T Recommendations Q.771–Q.775.

The TCAP dialogues are routed in the network by an underlying signalling layer designated SCCP (Signalling Connection Control Part). SCCP is a component in SS No. 7 used to control messages sent through the network when the message is addressed to an exchange having no direct connection with the sending exchange. SCCP is standardized in the ITUT-T recommendations Q.711–Q.716. The SCCP routing uses either one of two addressing mechanisms, referred to as GT addressing and SPC addressing, respectively. The GT addressing uses analysis of the received calling and called party addresses for determination of the link to the next routing entity, while the SPC addressing uses pre-specified trunk signalling identities to address a subsequent link to the next routing entity. For the services, the normal method for establishement of a TC-dialogue is initiated with a SCCP GT addressing request. A detailed description of operative procedures, coding and formatting of the SCCP capability can be found in the ITU-T Recommendations Q.711–Q.714.

A number of TCAP based telecommunication services have already been realized at the local level of the network hierarchy, and operate by using the dialled number information as global title addressing. In case the SCCP GT address used in association with the TCAP based service identifies a network service (e.g. freephone), or addresses a user which has changed his geographical location without changing his telephone number, by using a so called "number portability function", the SCCP GT address information will cause a termination of the dialogue at a node which does not have any knowledge of the location of the addressed user and consequently the requested end-to-end TC-dialogue will fail.

It should be noted, that the operation of these services is conventionally realized by establishment of a call unrelated end-to-end signalling relation between the originating and terminating entities and may last for a long period of time. As an example, the service "Call Completion to Busy Subscriber" (CCBS) establishes a dialogue between originating and terminating local exchanges for a maximum of 45 minutes.

In order to enable the operation of a TC-based service between peer originating and terminating entities, it is necessary to relay the resulting TC-dialogues at the intermediate interfering entity(ies). Thus, each interfering intermediate node, i.e. a local, a transit or a gateway exchange, performs a relay function between an incoming and an outgoing TC-dialogue. An end-to-end connectivity can be achieved by a chain of invoked relay functions at each interfering intermediate exchange.

The Swedish patent 504,405 describes a relay method for the association of TC-dialogues to solve the interaction between the services CCBS and Global Virtual Network Service GVNS routing function. The interaction between these two services requires a new service CCBS-GVNS ASE that to the CCBS specific ASE operations appends additional parameters and information elements used to locate the addressed user. The relay is achieved by implementing two "abstract service elements" ASE for the service CCBS, also referred to as CCBS-ASE entities and CCBS GVNS ASE, at a transit or gateway exchange, and a specific, not revealed logic which realizes the association. This method implies that for each new TC-based service, there is a need to introduce it also at that intermediate point and to design a logic to perform the needed association.

Furthermore, the interaction arising between the TCAP based services and other services being addressed by the SCCP GT. addresses, e.g. number portability, may not always require a modification to the service ASEs. Thus, there is a need to support a relay by a number translation of SCCP GT addresses and a relay where modification of ASEs are needed.

Within an intelligent network architecture, specified in ITU-T 1200 series of Recommendations, the call establishment mechanism is handled by SSP (Service Switching Point) physical entities, while the services are centralized in the network within an SCP (Service Control Point) physical entity. SSP is a node in the network where services may get support from an external data base located in a SCP. The communication between the SSP and SCP is done via INAP which is a TCAP based protocol.

For solving the interaction between TCAP based services and other services located in an SCP, there is a need to even communicate the TCAP based service ASE which terminates in an SSP with the interfering service located in an SCP without having the obligation for deploying all TCAP based service ASEs in all SSPs.

SUMMARY

A number of standardized supplementary services (e.g. CCBS) operate in the telecommunication network by using the TCAP end-to-end signalling capability, i.e. a direct relation between the originating and the destination entities of a call. These services establish the TC-dialogue by using a network address which, in particular cases, may identify a service (e.g. interaction with GVNS) or an incorrect geographical location of the remote user (e.g. number portability). Consequently, the end-to-end operation of the TCAP based service will fail either due to the lack of the service ASE or due to the absence of the addressed user at the addressed entity.

It is a first object of the present invention to provide a method and a system that permits a network operator to prevent the substantial number of service operation failures when the end-to-end TCAP based supplementary services realized at the peer entities, i.e. local exchanges, interact with other telecommunication services realized at an intermediate node, i.e. local or transit or gateway exchanges due to indirect addressing of the remote user.

It is a second object to provide a generic method which enables establishing of a relay link between an incoming TC-dialogue with an outgoing TC-dialogue at an intermediate node, resulting in a chain of end-to-end TC-dialogues between the originating local exchange node and the destination local exchange node.

It is a third object of the invention to offer the operator a transparent relay functionality without a need to deploy the TCAP based service ASE at intermediate nodes, and to provide a capability of differentiating the handling and the continuity of the chained dialogues based on the operation of involved telecommunication services.

It is a fourth object of the invention to provide a method for communicating the essential data elements between the physical entities, i.e. SSP and SCP, of an intermediate node based on intelligent network architecture for solving the said interaction, without deployment of the TCAP service ASE in all SSP nodes of a network. This communication method implies the facility of encapsulating the service ASE in a new TC-relay ASE being realized either as new operations within INAP or as another TCAP based supplementary service having own set of ASE data elements.

The invention is a method and a system in a telecommunication network for enabling a network operator to prevent service operation failure when there is an interaction between an end-to-end TCAP based supplementary service and an interfering telecommunication service. More particularly, it is the question of a case in which a subscriber connected to an originating local exchange node has requested activation of a supplementary service, being said TCAP based supplementary service, located in an application of said originating node. The supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected. The TC-dialogue terminates the request on a telecommunication service, being said interfering service, located in an application of an intermediate node.

The invention comprises means and steps for establishing a relay link between an incoming TC-dialogue and an outgoing TC-dialogue at the intermediate node for providing a chain of end-to-end TC-dialogues between the originating local exchange node and the destination local exchange node. A transparent relay functionality is used that is independent of utilizing the TCAP based supplementary service ASEs at intermediate nodes. The handling and continuity of the chained dialogues is differentiated based on the effect of the interaction caused by said interfering telecommunication service.

The transparent relay functionality communicates the TCAP based supplementary service ASE and said effect of the interaction between said incoming TC-dialogue, said interfering telecommunication service and said outgoing TC-dialogue.

The service ASE is encapsulated in a new TC-relay ASE that is realized either as new operations within Intelligent Network Application Part INAP or as another TCAP based supplementary service having an own set of ASE data elements.

Steps and means are provided for performing in the intermediate node, upon reception of an incoming TC-dialogue request related to a TCAP based supplementary service having a dedicated SubSystem Number SSN, and based on an analysis of the requested TCAP based supplementary service identity, as identified by a specific supplementary service Object IDentifier OID, and calling and called party address information sent together with the request, a number of essential interrelated measures.

A first one of these measures includes triggering of the transparent relay functionality in case either the OID is not recognized by the intermediate node, or the called party address information does not address a subscriber connected to the intermediate node.

A second measure initiates a TC-relay link procedure comprising preservation of the received TC-dialogue ID and sending of a query for number translation by communicating the called and calling party address information and the supplementary service ASE of the received TC-dialogue to the interfering telecommunication service.

A third measure includes analysing the received query and determinating by the interfering telecommunication service the new called party address information and the effect of the interaction with the TCAP based supplementary service as identified by the received OID.

In a fourth measure the TC-relay link procedure comprises establishing an outgoing TC-dialogue based on the received called party address information and the supplementary service ASE from the interfering telecommunication service. An association is built between the incoming and the outgoing TC-dialogues ID based on a received indication for handling of the TC-dialogue continuity.

For the step of differentiating the handling and continuity of the chained dialogues, there is provided an indication by the interfering telecommunication service on whether the TC-link relay functionality should use a Single Association Control Function SACF to establish a simple and single association between the incoming and the outgoing TC-dialogues, or a Multiple Association Control Function MACF to establish a multiple association using two SACFs between the incoming and the outgoing TC-dialogues.

Use of a SACF association is decided when the TCAP based supplementary service ASE used in the outgoing TC-dialogue is identical to the TCAP based supplementary service ASE received by the incoming TC-dialogue. Use of a MACF association is decided when the TCAP based supplementary service ASE used in the outgoing TC-dialogue is not identical to the TCAP based supplementary service ASE received by the incoming TC-dialogue.

BRIEF DESCRIPTION OF THE DRAWING

The invention will now be described more closely below with reference to the attached drawings, in which.

DETAILED DESCRIPTION OF EMBODIMENTS

A number of standardized supplementary services (e.g. CCBS) operate in the telecommunication network by using the TCAP end-to-end signalling capability, i.e. a direct relation between the service ASE at the originating and the destination nodes to which the subscribers are connected.

The TCAP based services establish the TCAP end-to-end TC-dialogue by using the SCCP routing mechanism i.e. SCCP GT called party address and the Sub System Number SSN which is an element of the SCCP addressing used to identify the application. Note that the SSN Octet value "0000 1011" has been dedicated by ITU-T for supplementary services. Furthermore, the distinction between the different supplementary services is further done by an Object Identifier which is a specific value used to address the appropriate service ASE.

In case the dialled B-number information which is used as the SCCP GT called party address relates to a network service, e.g. GVNS routing address, or to an incorrect geographical location of the remote user, e.g. number portability applies, then the end-to-end operation of the TCAP based service will fail. Thus, for a successful establishment of an end-to-end relation between the peer entities at an interfering node, in which the service is realized, it is necessary to arrange a TC-relay link between an incoming TC-dialogue and a new outgoing TC-dialogue addressing the remote user. Such a node becomes an intermediate node in the end-to-end relation between the originating and the terminating-nodes.

Furthermore, based on the fact that the interaction between the TCAP based services and other network services differs, e.g. CCBS and GVNS or CCBS and number portability, the TC-relay link functionality may also differ and therefore a passive mode association and an active mode association, as will be described more closely below, have been specified.

Figure 1:
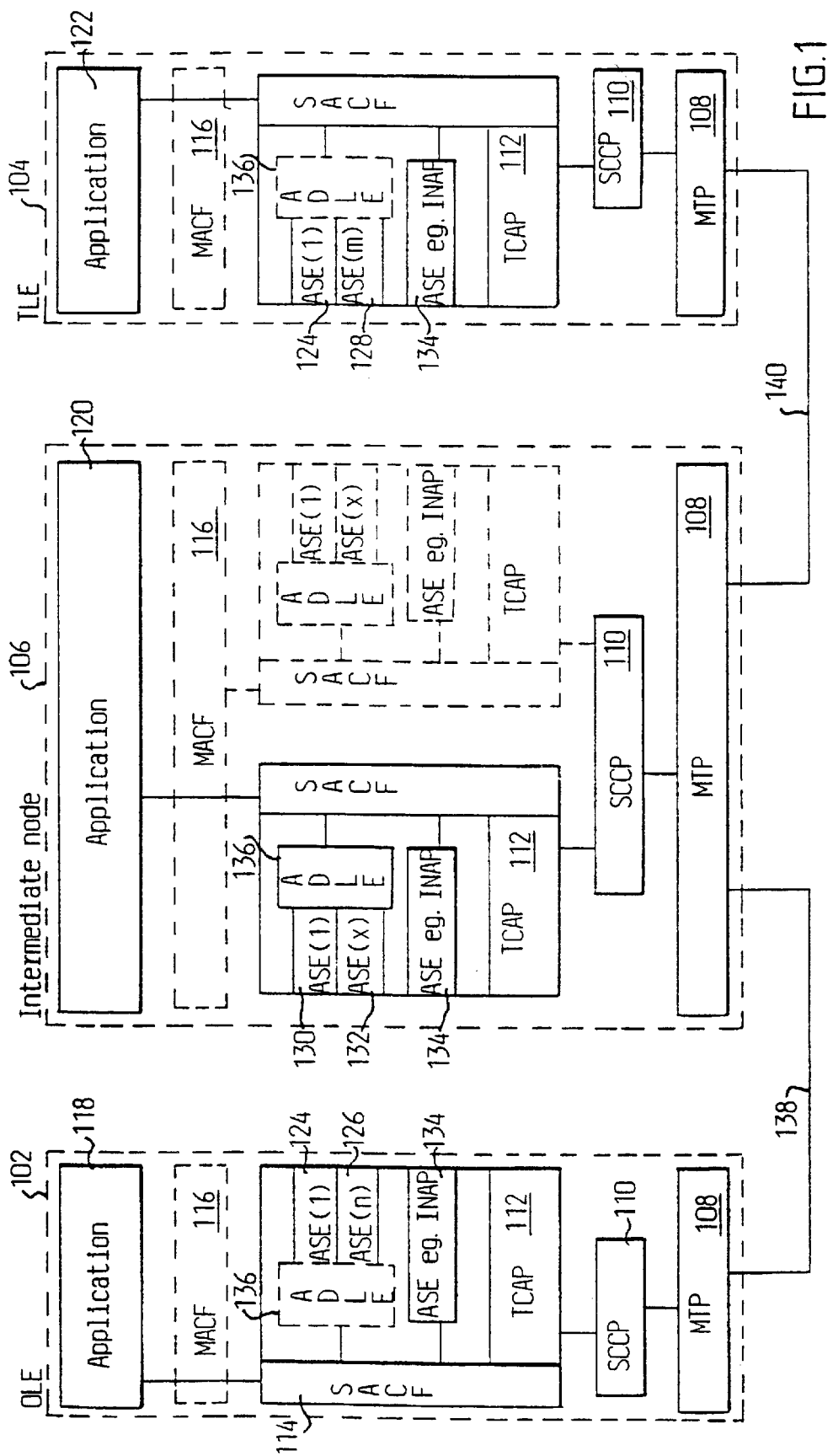
FIG. 1 shows a network architecture illustrating standard type modeling of a passive TC-relay mechanism at an intermediate node to accomplish an end-to-end relation between an ASE at an originating local exchange and a corresponding ASE at a terminating local exchange.
Figure 2:
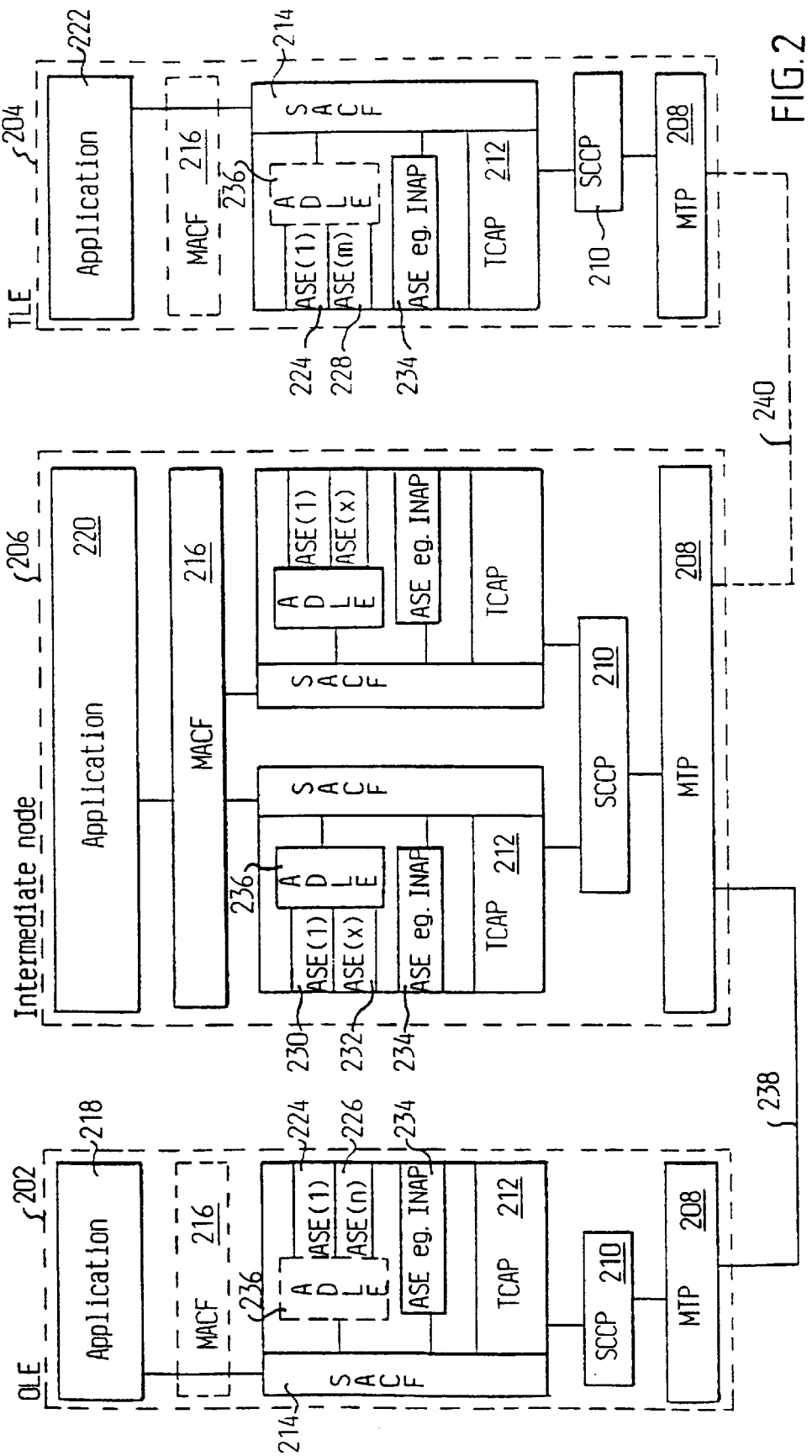
FIG. 2 shows a similar architecture as in FIG. 1 for illustrating standard type modeling of an active TC-relay mechanism at the intermediate node to accomplish an end-to-end relation between an ASE at the originating local exchange and the corresponding ASE at the terminating local exchange.

In FIGS. 1 and 2 there is shown a network architecture modeling comprising block entities involved in the establishment of end-to-end dialogues via a TC-relay link functionality. The modeling technique in question is according to a common description applied within ITU-T Recommendations, e.g. ITU-T Q.1218, for illustrating the relation between different block entities. More particularly, Recommendation ITU-T Q.1218 defines the INAP CS1 (Intellegent Network Application Part) protocol elements required for the support of the Intelligent Network Capability Set 1.

Although being otherwise identical, FIG. 1 and FIG. 2 differ in that FIG. 1 is realized to illustrate establishment of a passive TC-relay link functionality, also referred to as passive mode, whereas FIG. 2 is realized to illustrate establishment of an active TC-relay link functionality, also referred to as active mode. Depending on whether passive or active mode is applicable, i.e. FIG. 1 or FIG. 2, the lines defining some of the block entities in the respective Figure are dotted to indicate that the entity exists in the node but is not involved in the end-to-end relation between the peer entities.

The illustrative presentation of a TC-relay link in FIG. 1 and FIG. 2 shows a network architecture comprising an originating local exchange OLE 102/202, a terminating local exchange TLE 104/204 and an intermediate node 106/206. Above, as well as further on, a numeral beginning with 1 indicates that the block in question belongs to FIG. 1, whereas a numeral beginning with 2 indicates that the block in question belongs to FIG. 2. Each of these nodes comprises a common set of block entities which are used in the establishment of the TC-dialogues. The block entities of this common set are:

A Message Transfer Part, referred to as MTP, indicated by block 108/208 and used to transfer messages betwen nodes in the network when SS No. 7 is used. The MTP is defined in ITU-T Recommendations Q.701–Q.705.

A Signalling Connection Control Part, referred to as SCCP, indicated by block 110/210. SCCP is a component in SS No. 7 used to control messages sent through the network when the message is addressed to an exchange having no direct connection with the sending exchange. The SCCP routing uses either one of two addressing mechanisms, referred to as GT addressing and SPC addressing, respectively. The GT addressing uses analysis of the received calling and called party addresses for determination of the link to the next routing entity, while the SPC addressing uses pre-specified trunk signalling identities to address a subsequent link to the next routing entity. For the services, the normal method for establishment of a TC-dialogue is initiated with a SCCP GT addressing request. A detailed description of operative procedures, coding and formatting of the SCCP capability can be found in the ITU-T Recommendations Q.711–Q.716.

A Transaction Capability Application Part, referred to as TCAP, indicated by block 112/212. This functionality, also just referred to as "Transaction Capability" TC, is a component of SS No. 7 used to packet information from a user in a structured way and establishes an end-to-end dialogue with the remote user. The detailed specification for the operative procedures, the coding and the formatting of the TCAP and TC-dialogues are described in the ITU-T Recommendations Q.771–Q.775. The TCAP dialogues are routed in the network by an underlying signalling layer being the SCCP 110/210 described above.

A Single Association Control Function, referred to as SACF, indicated by block 114/214 and used to establish a simple and single association between an incoming side and an outgoing side of a dialogue.

A Multiple Association Control Function, referred to as MACF, indicated by block 116/216 and used when two SACFs are to be associated together.

An Application Distribution Logical Entity, referred to as ADLE, indicated by block 136/236, which has the task to terminate the incoming TC-dialogue, to trigger relay of the TC-dialogue, if required, and to perform the TC-relay link whenever necessary. The ADLE functionality will be described more closely below.

Each of the blocks 102/202, 104/204 and 106/206 also has an application 118/218, 120/220 and 122/222, respectively. This application incorporates a set of network services being applicable for that specific network entity. Thus, the services of the application 118/218 do not have to be identical to the services of the application 120/122 or those of the application 122/222. As an example, the service CCBS exists in the applications 118/218 and 122/222 of the local exchanges OLE 102/202 and TLE 106/206, respectively, whereas the service GVNS exists in the application 120/220 of the transit or gateway exchange 106/206.

There are furthermore different service ASEs, viz. 124/224 and 126/226 within the OLE 102/202; 130/230 and 132/232 within the intermediate node 106/206; and 124/224 and 128/228 within the TLE 104/204. In particularly, each ASE corresponds to a service within the application of that respective node and is used to communicate the relation between the service at the peer entities. The ASE 124/224 can e.g. be assumed, for the purpose of further explanation below, to be the CCBS ASE.

The modeling of a nodal entity, e.g. 102/202, 104/204 or 106/206, may also conform to the intelligent network architecture comprising the Service Switching Point (SSP) and the Service Control Point (SCP), as described in ITU-T Recommendations Q.1200 series. The possible adaptations of such architecture on OLE 102/202 or TLE 104/204 or intermediate node 106/206 is not shown in FIGS. 1 and 2. However, if this architecture applies, then the communication between the SSP and the SCP is obtained by a specific ASE, 134/234, which designates the Intelligent Network Application Part (INAP) protocol.

In the OLE 102/202, a subscriber connected to that node requests the activation of a service, e.g. CCBS, located in the application block entity 118/218 which in turn uses its corresponding service ASE, e.g. 124/224 (CCBS ASE), for the establishment of a relation with the corresponding service to obtain an end-to-end TC-dialogue between the two peer entities 102/202 and 104/204. The service ASE 124/224 establishes the TC-dialogue by indicating its object identifier and the Sub System Number dedicated for supplementary services, i.e. SSN="0000 1011", and sending a request, i.e. a TC-BEGIN primitive, in turn through the SACF 114/214, the TCAP 112/212, the SCCP 110/210 and the MTP 108/208. The TC-dialogue request is routed by the SCCP and MTP in the network using the dialled B-number as SCCP GT address information which locates the remote entity, e.g. 106/206. The requested TC-dialogue is routed to the remote entity on a physical route 138/238.

In the intermediate node 106/206, an incoming TC-dialogue on the physical route 138/238 is sent to the appropriate ASE via the MTP 108/208, the SCCP 110/210, the TCAP 112/212 and the SACF 114/214. The SCCP 110/210 identifies the receiver of the TC-dialogue by the SSN indicated above, which in FIGS. 1 and 2 corresponds to a termination of the TC-dialogue in the ADLE 136/236. The function of the ADLE 136/236 is to detect, and to perform if necessary, a TC-relay link between the incoming dialogue and an outgoing dialogue. When it has turned out that a TC-relay link has to be applied for this TC-dialogue, the ADLE 136/236 sends a request to the application 120/220 which in turn performs the necessary actions and notifies the ADLE 136/236 whether a passive or an active mode TC-relay link is required. The communication between the ADLE 136/236 and the application 120/220 may be achieved as an example by the protocol specified in FIG. 8. The operations stated therein may also be additionally applied as enhancement to existing protocols. As an example, they may be incorporated in the scope of a future protocol, e.g. INAP CS3 according to ITU-T Req. Q.1238.

The passive mode association, i.e. as illustrated in FIG. 1, is a TC-relay link which uses the same incoming service ASE, i.e. the data elements may be assigned new values but the same set of data elements will apply, on the outgoing TC-dialogue.

The active mode association, i.e. as illustrated in FIG. 2, is a TC-relay link established via a MACF 216 which interconnects the two SACFs 214 and uses another service ASE 232, e.g. the incoming service ASE may be modified by adding new parameters and data elements, on the outgoing TC-dialogue. For an active mode TC-relay link, it is necessary to perform at least two TC-relay links in two intermediate nodes in order to regenerate the original incoming service ASE for termination at the TLE 104/204 and to obtain an end-to-end association with the OLE 102/202. This chain is not shown in any of the figures.

In the intermediate node 106/206, the ADLE 136/236 generates the outgoing TC-dialogue by OID (Object IDentifier), SSN and called party number from the application to chain the association with the TLE 104/204 by sending a request, i.e. a TC-BEGIN primitive, through the SACF 114/214, the TCAP 112/212, the SCCP 110/210 and the MTP 108/208. The request is sent accordingly to the TLE 104/204 on the physical link 146/240.

In the TLE 104/204, an incoming TC-dialogue on the physical route 140/240 is sent to the appropriate ASE via the MTP 108/208, the SCCP 110/210, the TCAP 112/212 and the SACF 114/214. The received SSN value and the service specific object identifier value indicates that the TC-dialogue is addressed to the service ASE 124/224, e.g. CCBS ASE, which in turn sends the request to the associated service, e.g. CCBS, within the application 122/222.

Thus, the end-to-end association of the service between the OLE 102/202 and the TLE 104/204 is accomplished via a TC-relay link mechanism at the intermediate node 106/206. The continuation of a TC-relayed linked dialogue between the OLE 102/202 and the TLE 104/204 will pass the intermediate node 106/206 either transparently or via the application 120/220 depending on the applicable TC-relay mode, i.e. passive or active with or without triggering.

The association between the incoming TC-dialogue and the outgoing TC-dialogue is preserved at the intermediate node 106 until the end-to-end association is ended. The linkage is identified by the incoming and outgoing data, such as, the transaction-ID and the SCCP addresses, as shown in Table 1 below.

TABLE 1

| Incoming Transaction _ID (or MACF- link) | Outgoing Transaction _ID (or MACF- link) | Trig- gering Re- guest | Incoming SCCP address | Outgoing SCCP addresses |
|---|---|---|---|---|
| ID | ID | Yes/No | Calling, Called | Calling, Called |
| ID | ID | Yes/No | ---"--- | ---"--- |
| . | . | . | . | . |
| . | . | . | . | . |
| . | . | . | . | . |

The transaction-ID is an identity generated by the TCAP which identifies the TC-dialogue being established. The triggering request column in Table 1 is a specific indication associated with the active mode TC-relay link and is used by the service to indicate its interest in the supervision of the TC-dialogue continuation. If triggering is not required, then the TC-dialogue data elements will be mapped from the incoming side to the outgoing side of the established TC-relay link at the intermediate node 106/206.

Figure 3:
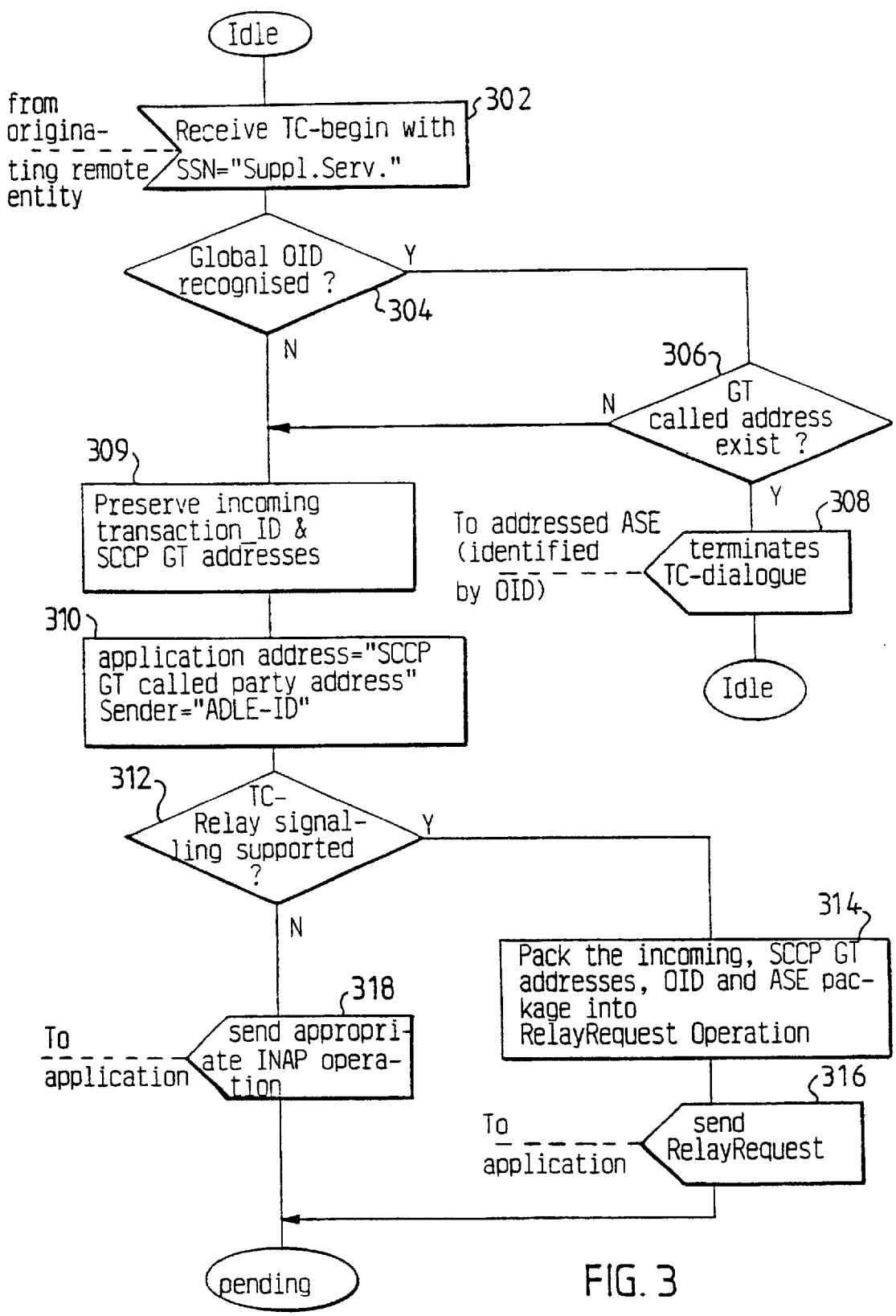
FIGS. 3, 4 and 5 are flowcharts illustrating actions performed at the intermediate node of FIG. 1 or 2 upon. triggering of a TCAP based supplementary service and the establishment of a passive or an active TC-relay association between incoming and outgoing TC-dialogues.
Figure 4:
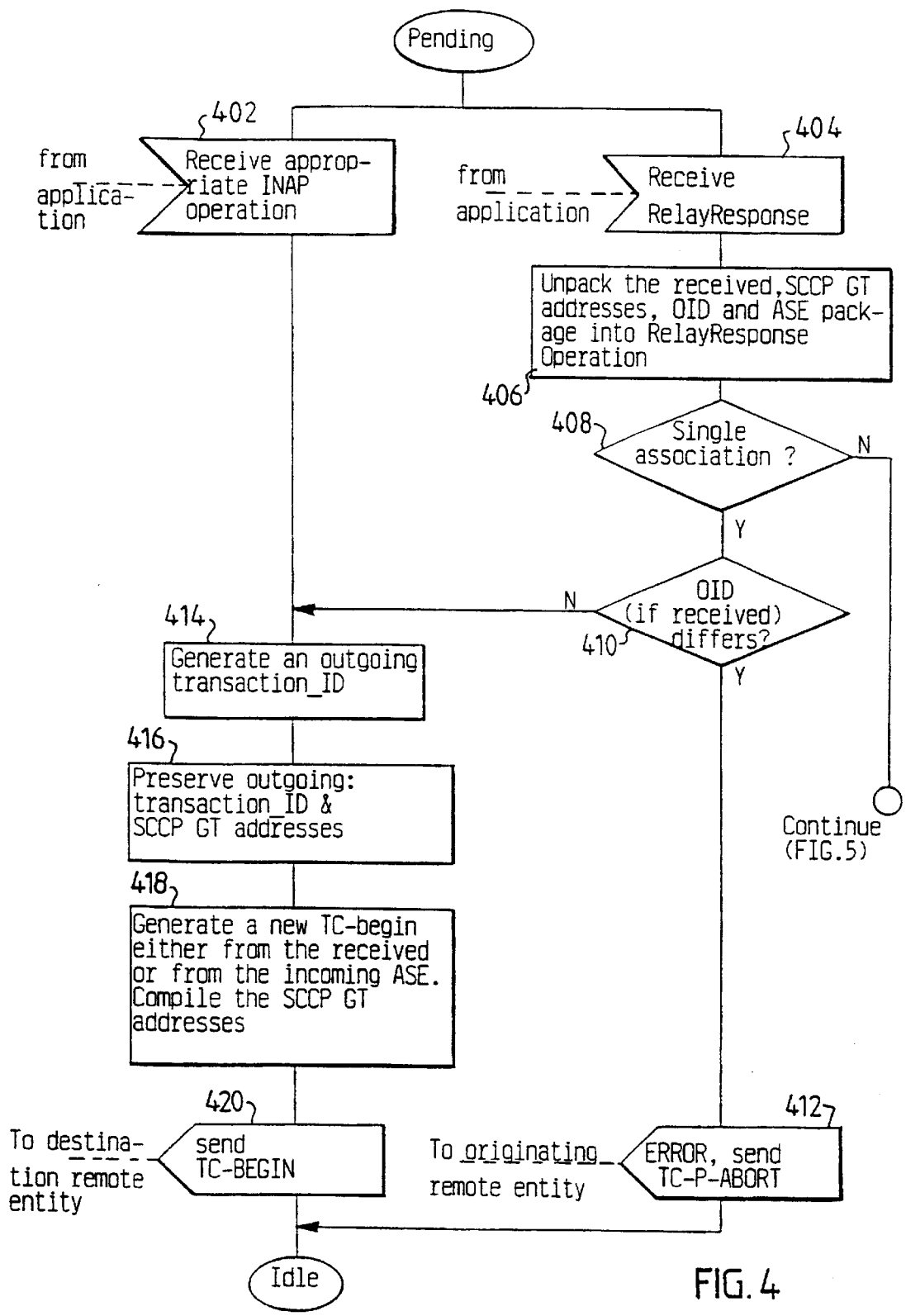
Figure 5:
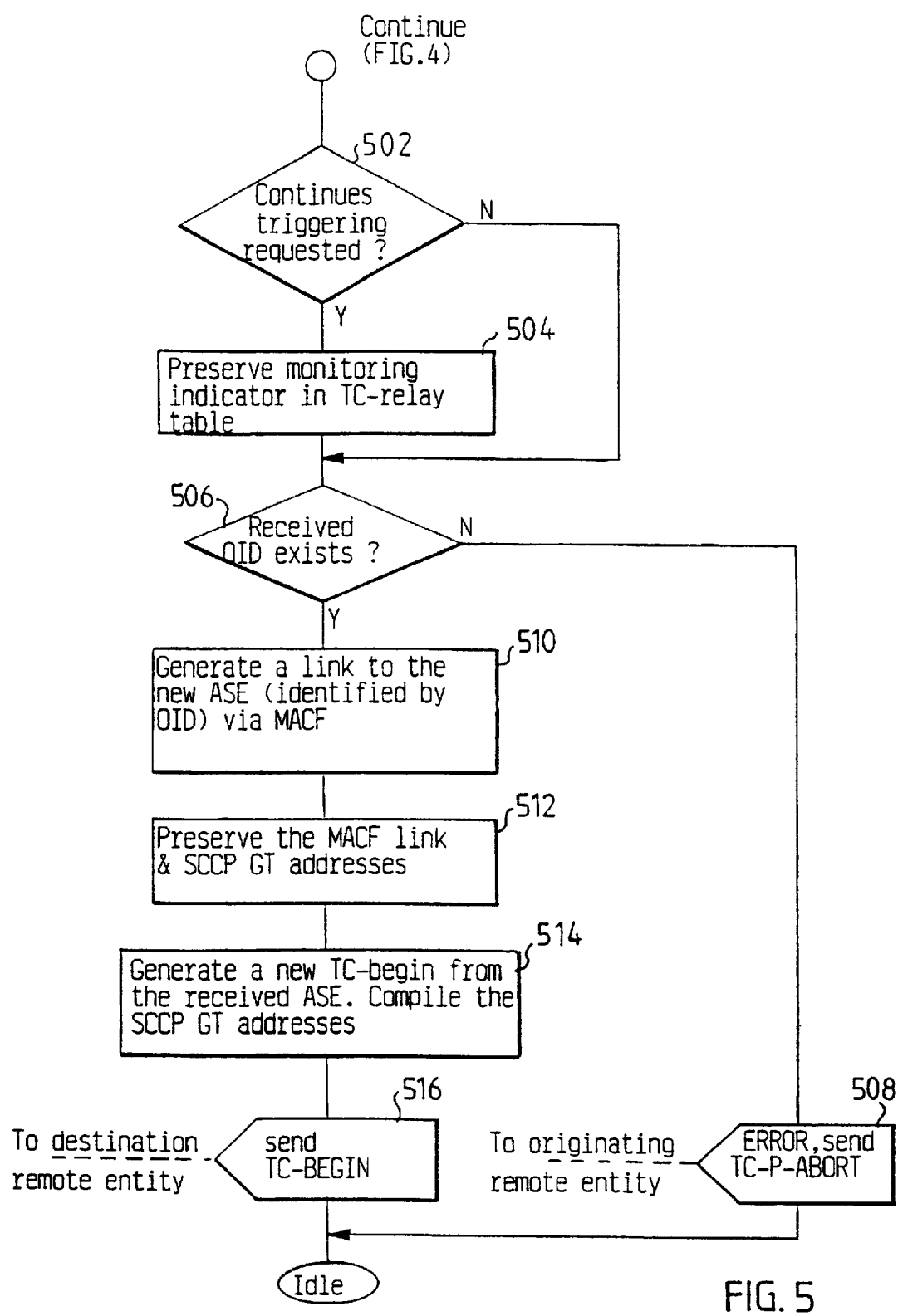

FIGS. 3, 4 and 5 are flowcharts illustrating actions performed at the intermediate node of FIG. 1 or 2 upon triggering of a TCAP based supplementary service and the establishment of a passive or an active TC-relay association between incoming and outgoing TC-dialogues. When describing these actions below, reference will also be made to the TC-relay protocol specified in FIG. 8 when applicable.

FIG. 3 illustrates steps taken by the ADLE 136/236 between the reception of the TC-dialogue and sending an appropriate result of these steps to the application.

Upon reception of a TC-begin having the SSN="000 1011", the request is terminated in the ADLE that decides whether the TC-relay link functionality should be invoked or not. The decision is based on criteria appearing in Table 2 below.

TABLE 2

| GLOBAL OID | SCCP CALLED ADDRESS | ACTIONS |
|---|---|---|
| Yes | OK | No Relay |
| Yes | NOK | Relay |
| No | OK | Relay |
| No | NOK | Relay |

In Table 2:

OK=the received SCCP called address points out a defined user within the node 304.

NOK=the received SCCP called address is a user having number portability indication or a service identifier, etc.

In FIG. 3, block 302 indicates reception of the TC-begin in the ADLE. In step 304 the ADLE analyses whether a global object identity OID of the ASE can be recognized. If yes, a further step 306 is to investigate whether there exists a GT called address. If yes, the TC-dialogue is terminated in step 308 and the TC-request originated in OLE 102 is forwarded to the addressed ASE identified by the OID as recognized in step 304. This situation corresponds to line 1 in Table 2, meaning that the TC-relay functionality shall not be invoked.

If the global OID cannot be recognized in step 304, irrespective of whether a GT called address exists or not, corresponding to lines 3 and 4 in Table 2, the TC-relay functionality shall be invoked. The same will be the case if the addressed GT called address cannot be found in step 306, corresponding to line 2 in the Table.

A further step 309 by the ADLE 136 will now be to preserve incoming transaction$_{13}$ID and SCCP GT addresses. A next step 310 by the ADLE 136 is to form a message stating application address="SCCP GT called party address", identifying the service addressed, and Sender= "ADLE-ID", identifying the initiator of the request.

In step 312, the ADLE 136 establishes whether TC-relay signalling is supported. The decision with respect to this depends upon the protocol used for the communication.

In case an ADLE and an application at an intermediate node reside within the same entity, then the communication is achieved by an internal communication scheme which is not dealt with here. However, when an intermediate node conforms to an intelligent network architecture or when the service being addressed, e.g. number translation service, resides in another entity, the communication between the ADLE and the network service within the application is achieved by using either one of the following two types of protocol.

1. An existing protocol, e.g. INAP Capability Set 1 (CS1) as described in ITU-T Recommendations Q.1210–Q.1219. The fact that such an existing protocol does not have the capability of transporting the TC-relay link data elements the way illustrated by FIG. 8, will always imply that the resulting end-to-end association is a passive mode TC-relay link which means a capability of modifying the SCCP GT address information.

2. An enhanced protocol, e.g. INAP Capability Set 3 (CS3) or an TCAP based ADLE ASE according to FIG. 8, or any other appropriate TCAP based protocol.

If yes in step 312, i.e. the communication is based upon the type 2 protocol, the ADLE 136 packs the incoming SCCP GT addresses, OID and ASE package into RelayRequest Operation in step 314 and sends the operation to the application 120 in step 316, cf. the protocol according to FIG. 8.

If no in step 312, i.e. the communication is based upon the type 1 protocol, the ADLE 136 sends an appropriate INAP operation to the application 120 in step 318.

In FIG. 4, there are shown the steps taken by the ADLE 136 upon having received the requested INAP operation or RelayResponse from the application 120 as indicated by blocks 402 and 404.

In case of the RelayResponse having been received, step 406 unpacks the received SCCP GT addresses, OID and ASE package from RelayResponse Operation, cf. the FIG. 8 protocol. Step 408 establishes if there is the question of a single association. If no, the procedure continues as will be described later on with reference to FIG. 5.

If yes in step 408, step 410 establishes if the OID in step 406, if received, differs from the OID in step 314 in the terminated dialogue. If yes, there is an error and step 412 causes sending of a message "ERROR, send TC-P-ABORT", or any equivalent Error primitive, to the originating remote entity, i.e. the OLE 102.

If no in step 410, the procedure continues with step 414 in which generation of an outgoing transaction_ID is performed. In step 416 the outgoing transaction_ID & SCCP GT addresses are preserved. In step 418 there is generated a new TC-begin either from the ASE received in the INAP operation in step 402, or the ASE 124 received from the originating node OLE 102. The SCCP GT addresses are compiled from the received sccpCalledAddress, cf. FIG. 8. In step 420, the TC-begin is sent to the destination remote entity, i.e. TLE 104.

FIG. 5 is a flow chart illustrating the procedure following upon the decision taken in step 408 in FIG. 4 that the response identifies a multiple association.

In step 502 there is performed a check to clarify if triggering requested continues. If yes, there is preserved, in step 504, monitoring indicator in the TC-relay table 1. If no in step 502, the flow proceeds directly in this case with step 506 that follows also upon step 504. In step 506 it is established whether OID received in RelayResponse according to step 404 in FIG. 4 exists.

In case the received OID does not exist, then the intermediate node does not support the requested ASE, and the flow ends in step 508 in which a message "ERROR, send TC-P-ABORT" is sent to the originating remote entity, i.e. the OLE 102. If yes in step 506, the procedure continues as follows.

In step 510 a link to the new ASE identified by OID and received from the application 120 in step 406, via MACF.

In step 512 the MACF link and SCCP GT addresses are preserved.

In step 514 a new TC-begin is generated from the received ASE. The SCCP GT addresses are compiled.

In step 516 a TC-begin is sent to destination remote entity TLE 104.

Figure 6:
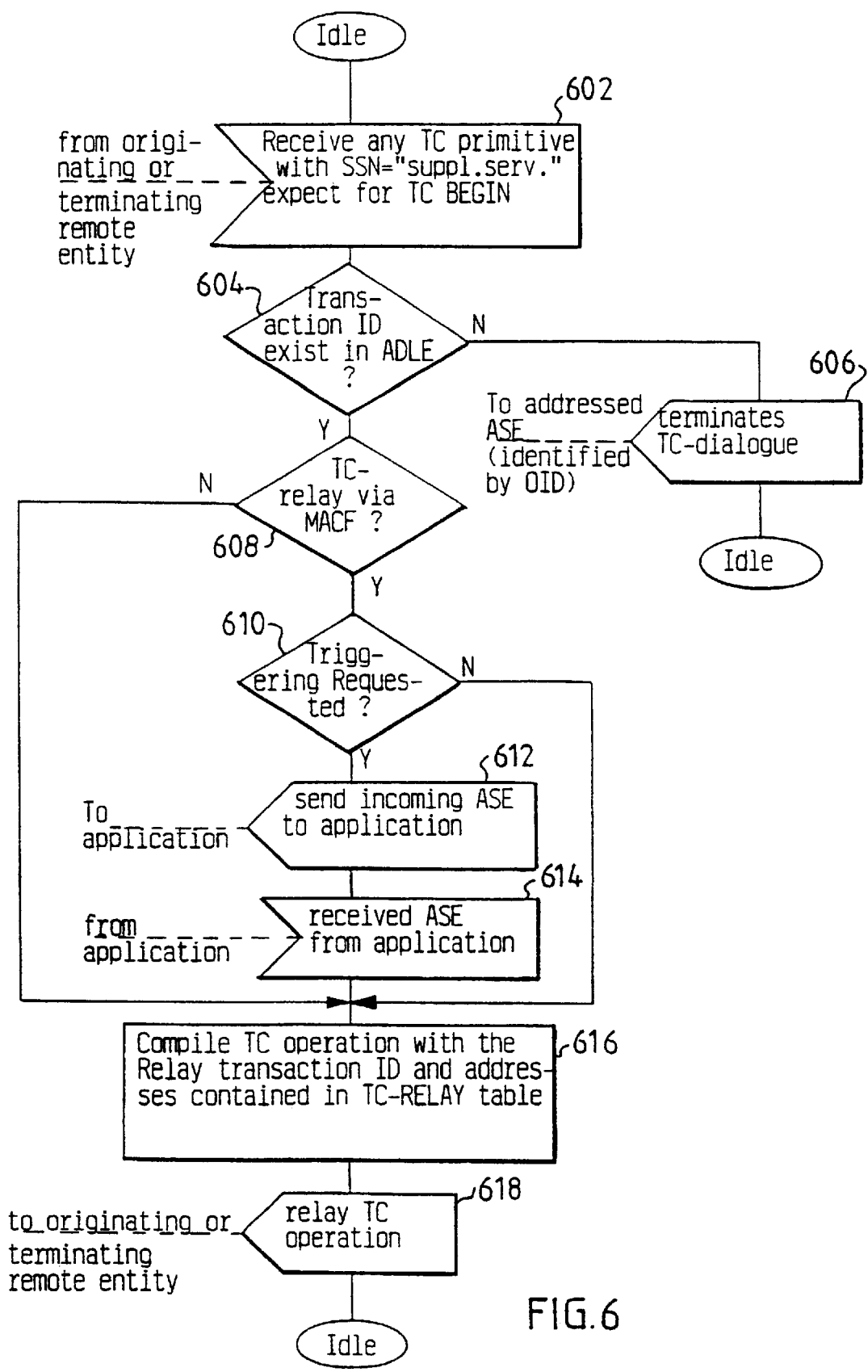
FIG. 6 is a flowchart illustrating actions performed at the intermediate node for the continuation of the established TC relay link of FIGS. 3–5 until the TC-dialogue transaction between the originating and the terminating entities has been ended.

FIG. 6 illustrates actions performed at the intermediate node 206 for the continuation of the established TC-relay link of FIGS. 3–5 until the TC-dialogue transaction between the originating and the terminating entities has been ended.

Block 602 indicates reception in the ADLE 240 of any TC primitive with SSN="supplementary service" expect for TC-begin from originating or terminating remote entity 202 or 204, respectively.

In step 604 there is investigated whether Transaction ID exists in ADLE. If no, the TC-dialogue is terminated in step 606 and a message is sent to the addressed ASE as identified by-the OID. If yes in step 604, step 608 investigates whether the TC-relay shall be sent via MACF 216 according to the preserved information in Table 1.

If yes in step 608, it is investigated in step 610 whether triggering of the service has been requested. If yes, the incoming ASE is sent to the application 220 in step 612. In step 614 an ASE is received from the application 220.

In step 616 compilation is performed of the TC operation with the Relay transaction ID and address contained in the TC-relay Table 1, and in step 618 the relay TC operation is sent to originating or terminating remote entity 202 or 204, respectively.

If no in either step 608 or step 610, the flow proceeds directly to step 616 in both cases.

Figure 7:
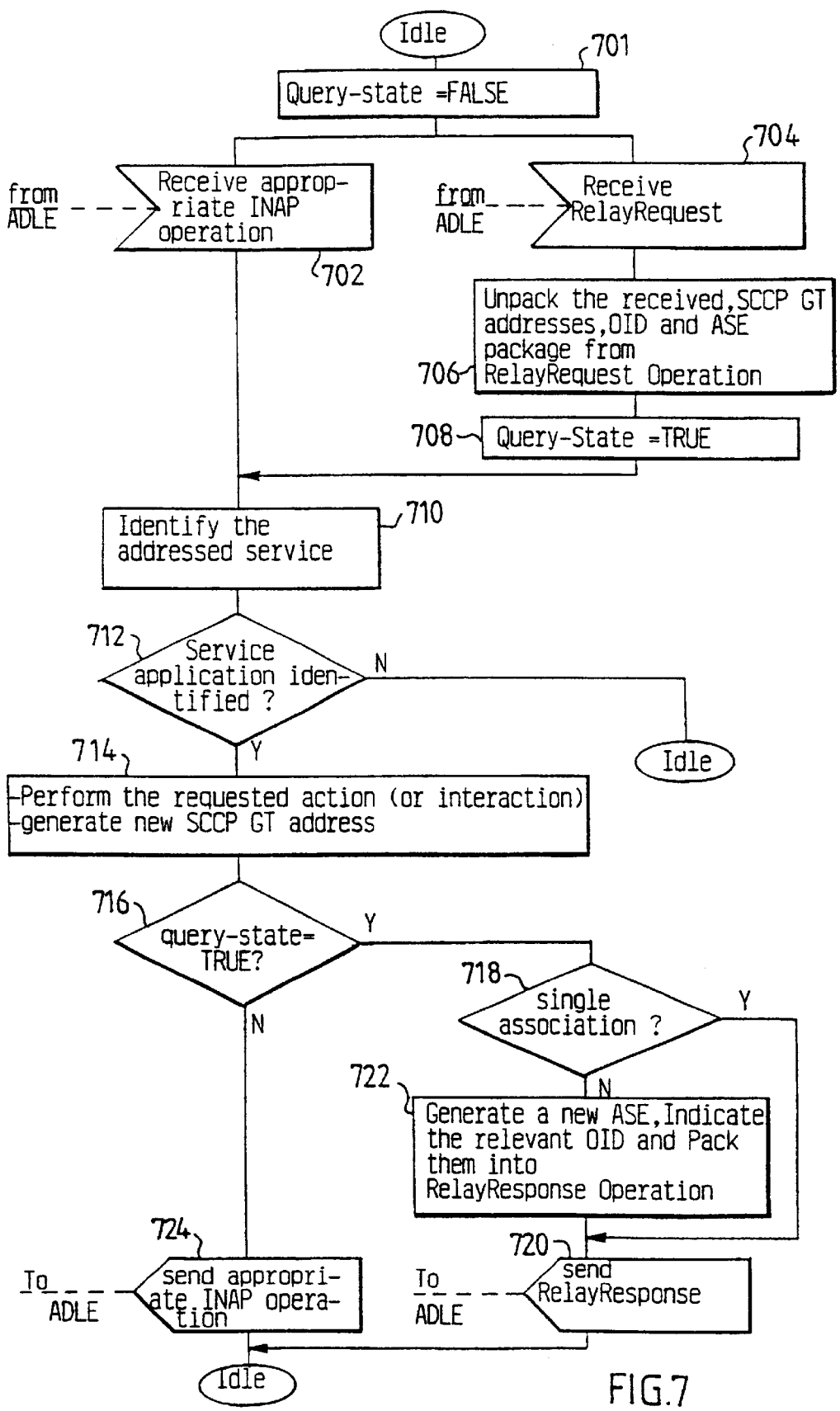
FIG. 7 is a flowchart illustrating actions performed by an application at the intermediate node while making use of the TC-relay link establishment in FIGS. 3–6.

FIG. 7 illustrates actions taken by application 120/220 at the intermediate node 106/206, between receiving either the INAP operation sent in step 318 or the operation sent in step 316 in FIG. 3 and sending a response thereto received in step 402 or step 404, respectively, in FIG. 4, or between receiving the ASE sent in step 612 in FIG. 6 and sending an ASE in response thereto received in step 614 in FIG. 6. Use is made of the TC-relay link establishment caused by step 312 in FIG. 3 or step 608 in FIG. 6, respectively.

A query state flag is defined as Query–state=FALSE in step 701. The INAP operation sent in step 318 is received in step 702 and the RelayRequest operation sent in either step 316 or step 612 is received in step 704. For the latter case, the flow proceeds with step 706, in which the received SCCP GT addresses, OID and ASE package from the RelayRequest operation (cf. FIG. 8) are unpacked and the query state flag is set to TRUE in step 708.

In both cases the flow proceeds, either from step 702 or from step 708, with step 710 in which an attempt to identify the addressed service application is made. In step 712 it is established whether the service application is identified. If no, there is an error and the flow returns to ADLE in step 713. If yes, there is performed in step 714 the requested action, or interaction, and generated a new SCCP GT address.

If yes in step 716, it is established in step 718 whether it is the question of a single association. If this is the case, the flow proceeds to step 720 in which RelayResponse is sent to the ADLE, to be received therein as in step 404 or 616. If no in step 718, step 720 is preceded by step 722, in which a new ASE is generated, relevant OID is indicated, and these are packed into the RelayResponse operation.

If no in step 716 there is sent an appropriate INAP operation in step 724 to ADLE 136 to be received there in step 402.

Below there is illustrated an example of a TCAP based ASE operation, provided in the form of a TC-Relay Protocol, used by the ADLE to communicate with the service application in 120/220. These operations might also be supported in other protocols, e.g. the future INAP CS3 protocol.

```
DEFINITIONS EXPLICIT TAGS ::=
BEGIN
IMPORTS   OPERATION,
          ERROR
          FROM TCAPMessages { ccitt recommendation q 773
          module A(0)}
-- operation types
RelayRequest ::= OPERATION
    PARAMETER SEQUENCE {
      sccpCalledAddress          Address
      sccpCallingAddress     [1] Address OPTIONAL,
      Service ObjectId       [2] ServiceObjectID OPTIONAL,
      AsePackage             [3] AsePackage OPTIONAL, . . . )
                             --  If serviceObjectId is omitted,
                                 then the
```

-continued

```
                                          -- application assumes an addresses
                                             translation
                                          -- relay request.
-- End of RelayRequest operation definition
RelayResponse ::= OPERATION
    PARAMETER SEQUENCE {
        singleAssociation               BOOLEAN DEFAULT TRUE,
        triggeringRequested             BOOLEAN DEFAULT FALSE.
        sccpCalledAddress               Address,
        sccpCallingAddress          [1] Address OPTIONAL,
        serviceObjectId             [2] ServiceObjectId OPTIONAL,
        asePackage                  [3] AsePackage OPTIONAL, . . . }
                                          -- The singleAssociation
                                             designates SACF or
                                          -- MACF indicator. If false, the
                                             service
                                          -- Object ID becomes mandatory
                                             element
-- End of RelayResponse operation definition
-- constants and data type definitions
Address         ::= OCTECT STRING (SIZE
                    (1..maxlengthofaddressfield))
                    -- the address is coded as described
                       in itu-t recommenation q 713
ServiceObjectId ::= OBJECT IDENTIFIER
AsePackage      ::= CHARACTER STRING (SIZE
                    (1..maxlengthofasedata))
-- End of Relay-Protocol
```

The RelayRequest operation transmits the service ASE sent from the OLE 102/202 to the intermediate node in 106/206. The sccpCalledAddress and sccpCallingAddress parameters carry the received SCCP addressing information, i.e. SCCP GT Called and Calling party addresses, the serviceObjectId parameter carries the service object ID defined by the sending ASE, and the asePackage parameter carries the encapsulated ASE data elements as received from the sending ASE, e.g. 124 in OLE 102/202.

The RelayResponse operation transmits the service ASE which is sent by the intermediate node 106/206 to the succeeding node, e.g. TLE 104/204. The Boolean variables singleAssociation and triggeringRequested indicates to the ADLE 136/236 the handling of the outgoing TC-dialogue. The sccpCalledAddress and the sccpCallingAddress parameters carry the sent SCCP addressing information, i.e. SCCP GT Called and Calling party addresses, the serviceObjectId parameter carries the service object ID identifying the sent ASE in case of MACF association, and the asePackage parameter carries the encapsulated ASE data elements which are sent to the succeeding node in the sent ASE, e.g. 132 in OLE 106/206.

What is claimed is:

1. A method in a telecommunication network, in which a subscriber connected to an originating local exchange node has requested activation of a supplementary service located in an application of said originating node, wherein said supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected, and said TC-dialogue terminates the request on an interfering telecommunication service located in an application of an intermediate node, the method for enabling a network operator to prevent service operation failure when there is an interaction between said end-to-end TCAP based supplementary service and said interfering telecommunication service, the method comprising:

a) establishing a relay link between an incoming TC-dialogue and an outgoing TC-dialogue at the intermediate node for providing a chain of end-to-end TC-dialogues between the originating local exchange node and the destination local exchange node, while using a transparent relay functionality being independent of utilizing TCAP based supplementary service ASEs at intermediate nodes, b) differentiating handling and continuity of the chained dialogues based on the effect of the interaction caused by said interfering telecommunication service, wherein said transparent relay functionality communicates the TCAP based supplementary service ASE and said effect of the interaction between said incoming TC-dialogue, said interfering telecommunication service and said outgoing TC-dialogue, and encapsulating the service ASE in a new TC-relay ASE that is realized either as new operations within Intelligent Network Application Part INAP or as another TCAP based supplementary service having an own set of ASE data elements.

2. A method in a telecommunication network, in which a subscriber connected to an originating local exchange node has requested activation of a supplementary service located in an application of said originating node, wherein said supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected, and said TC-dialogue terminates the request on an interfering telecommunication service located in an application of an intermediate node, the method for enabling a network operator to prevent service operation failure when there is an interaction between said end-to-end TCAP based supplementary service and said interfering telecommunication service, wherein the method comprises:

a) establishing a relay link between an incoming TC-dialogue and an outgoing TC-dialogue at the intermediate node for providing a chain of end-to-end TC-dialogues between the originating local exchange node and the destination local exchange node, while using a transparent relay functionality being independent of utilizing TCAP based supplementary service ASEs at intermediate nodes, b) differentiating handling and continuity of the chained dialogues based on the effect of the interaction caused by said interfering telecommunication service;

performing in the intermediate node, in response to reception of an incoming TC-dialogue request related to a TCAP based supplementary service having a dedicated SubSystem Number SSN, and based on an analysis of the requested TCAP based supplementary service identity, as identified by a specific supplementary service Object Identifier OID, and calling and called party address information sent together with the request, the steps of:

i) triggering the transparent relay functionality in case either the OID is not recognized by the intermediate node, or the called party address information does not address a subscriber connected to the intermediate node, ii) initiating a TC-relay link procedure comprising preservation of the received TC-dialogue ID and sending of a query for number translation by communicating the called and calling party address information and the supplementary service ASE of the received TC-dialogue to the interfering telecommunication service, iii) analysing the received query and determining by the interfering telecommunication service the new called party address information and the effect of the interaction with the TCAP based supplementary service as identified by the received OID, and iv) accomplishing the TC-relay link procedure comprising establishing an outgoing TC-dialogue based on the received called party address information and the supplementary service ASE from the interfering telecommunication service, and building an association between the incoming and the outgoing TC-dialogues ID based on a received indication for handling of the TC-dialogue continuity.

3. A method according to claim 2, comprising performing steps i) and ii) by an Application Distribution Logic Entity ADLE and a first SACF that receives the TC-dialogue and transfers it to said ADLE for further handling.

4. A method according to claim 3, comprising establishing said new TC-relay link by the ADLE entity ordering said first SACF to establish a new association by requesting assistance of a second SACF via an MACF.

5. A method according to claim 3, comprising performing in step ii) the further steps in the ADLE of preserving incoming transaction ID and Signalling Connection Control Part SCCP Global Title GT addresses, forming a message identifying the service addressed and the initiator of the request, establishing whether a current protocol used for communication supports TC-relay signalling, and, if supported, packing the incoming SCCP GT addresses, OID and ASE package into a relay request operation and sending the operation to the application in the intermediate node to be handled therein to form a suitable relay response to ADLE, if not supported, sending an appropriate operation under the current protocol to the application in the intermediate node to be handled therein so as to return a new appropriate operation under the current protocol to ADLE.

6. A method according to claim 5, comprising performing in the application, in response to the reception of the operation under the current protocol, the steps of identifying the addressed service application, performing the requested action, or interaction, and generating a new SCCP GT address, sending the appropriate new operation under the current protocol.

7. A method according to claim 6, performing in the ADLE, in response to receipt therein of the operation under the current protocol, the steps of generating an outgoing transaction ID, preserving outgoing transaction ID & SCCP GT addresses, generating a new TC-begin from the ASE received in the operation, compiling the SCCP GT addresses, sending the TC-begin to the destination remote entity.

8. A method according to claim 5, comprising performing in the application, in response to the reception of the relay request operation, the steps of unpacking the SCCP GT addresses, OID and ASE package, the steps of identifying the addressed service application, performing the requested action, or interaction, and generating a new SCCP GT address, sending a relay response operation to the ADLE, said response operation in the case of a multiple association being preceded by generation of a new ASE, indication of relevant OID and packing of these into the relay response operation before sending.

9. A method according to claim 8, performing in the ADLE, in response to receipt therein of the relay reponse from the application, and in case of a single association, the steps of unpacking the received SCCP GT addresses, OID and ASE package from the relay response operation, generating an outgoing transaction ID, preserving outgoing transaction ID & SCCP GT addresses, generating a new TC-begin from the received ASE, compiling the SCCP GT addresses, sending the TC-begin to the destination remote entity.

10. A method according to claim 8, performing in the ADLE, in response to receipt therein of the relay reponse from the application, and in case of a multiple association, the: steps of generating a link to the new ASE via MACF, preserving the MACF link and the SCCP GT addresses, generating a new TC-begin from the received ASE and compiling the SCCP GT addresses, sending a TC-begin to destination remote entity.

11. A method according to claim 5, comprising performing, at the intermediate node for the continuation of the established TC-relay link until the TC-dialogue transaction between the originating and the terminating entities has been ended, and in response to reception in the ADLE of any TC-primitive with SSN="supplementary service" expect for TC-begin, and in case transaction ID does not exist in the ADLE, the step of terminating the TC-dialogue and sending message to addressed ASE as identified by the OID.

12. A method according to claim 5, comprising performing, at the intermediate node for the continuation of the established TC-relay link until the TC-dialogue transaction between the originating and the terminating entities has been ended, and in response to reception in the ADLE of any TC-primitive with SSN="supplementary service" expect for TC-begin, and in case transaction ID exists in the ADLE, TC-relay shall be sent via MACF, and triggering of the service has been requested, the steps of sending incoming ASE to application for generation of new ASE, receiving new ASE from application, compiling TC-operation with the relay transaction ID and address, sending relay TC-operation to originating or terminating remote entity.

13. A method according to claim 5, comprising performing, at the intermediate node for the continuation of the established TC-relay link until the TC-dialogue transaction between the originating and the terminating entities has been ended, and in response to reception in the ADLE of any TC-primitive with SSN="supplementary service" expect for TC-begin, and in case transaction ID exists in the ADLE, TC-relay shall be sent via MACF, but triggering of the service has not been requested, the steps of compiling TC-operation with the relay transaction ID and address, sending relay TC operation to originating or terminating remote entity.

14. A method according to claim 5, comprising performing, at the intermediate node for the continuation of the established TC relay link until the TC-dialogue transaction between the originating and the terminating entities has been ended, and in response to reception in the ADLE of any TC-primitive with SSN="supplementary service" expect for TC begin, and in case transaction ID exists in the ADLE, but TC-relay shall not be sent via MACF, the steps of compiling TC-operation with the relay transaction ID and address, sending relay TC-operation to originating or terminating remote entity.

15. A method in a telecommunication network, in which a subscriber connected to an originating local exchange node has requested activation of a supplementary service located in an application of said originating node, wherein said supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected, and said TC-dialogue terminates the request on an interfering telecommunication service located in an application of an intermediate node, the method for enabling a network operator to prevent service operation failure when there is an interaction between said end-to-end TCAP based supplementary service and said interfering telecommunication service, wherein the method comprises:

a) establishing a relay link between an incoming TC-dialogue and an outgoing TC-dialogue at the intermediate node for providing a chain of end-to-end TC-dialogues between the originating local exchange node and the destination local exchange node, while using a transparent relay functionality being independent of utilizing TCAP based supplementary service ASEs at intermediate nodes, b) differentiating handling and continuity of the chained dialogues based on the effect of the interaction caused by said interfering telecommunication service;

providing, for the step of differentiating the handling and continuity of the chained dialogues, an indication by the interfering telecommunication service on whether the TC-link relay functionality should use a Single Association Control Function SACF to establish a simple and single association between the incoming and the outgoing TC-dialogues, or a Multiple Association Control Function MACF to establish a multiple association using two SACFs between the incoming and the outgoing TC-dialogues.

16. A method according to claim 15, comprising deciding use of a SACF association when the TCAP based supplementary service ASE used in the outgoing TC-dialogue is identical to the TCAP based supplementary service ASE received by the incoming TC-dialogue, and deciding use of a MACF association when the TCAP based supplementary service ASE used in the outgoing TC-dialogue is not identical to the TCAP based supplementary service ASE received by the incoming TC-dialogue.

17. A system in a telecommunication network, in which a subscriber connected to an originating local exchange node has requested activation of a supplementary service located in an application of said originating node, said supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected, and said TC-dialogue terminates the request on an interfering telecommunication service located in an application of an intermediate node, the system for enabling a network operator to prevent service operation failure when there is an interaction between said end-to-end TCAP based supplementary service and said interfering telecommunication service, the system comprising:

a) means for establishing a relay link between an incoming TC-dialogue and an outgoing TC-dialogue at the intermediate node for providing a chain of end-to-end TC-dialogues between the originating local exchange node and the destination local exchange node, while using a transparent relay functionality being independent of utilizing TCAP based supplementary service ASEs at intermediate nodes, b) means for differentiating the handling and continuity of the chained dialogues based on the effect of the interaction caused by said interfering telecommunication service, wherein said transparent relay functionality communicates with the TCAP based supplementary service ASE and said effect of the interaction between said incoming TC-dialogue, said interfering telecommunication service and said outgoing TC-dialogue, and means for encapsulating the service ASE in a new TC-relay ASE that is realized either as new operations within Intelligent Network Application Part INAP or as another TCAP based supplementary service having an own set of ASE data elements.

18. A system in a telecommunication network, in which a subscriber connected to an originating local exchange node has requested activation of a supplementary service located in an application of said originating node, wherein said supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected, and said TC-dialogue terminates the request on an interfering telecommunication service located in an application of an intermediate node, the system for enabling a network operator to prevent service operation failure when there is an interaction between said end-to-end TCAP based supplementary service and said interfering telecommunication service, the system comprising:

a) means for establishing a relay link between an incoming TC-dialogue and an outgoing TC-dialogue at the intermediate node for providing a chain of end-to-end TC-dialogues between the originating local exchange node and the destination local exchange node, while using a transparent relay functionality being independent of utilizing TCAP based supplementary service ASEs at intermediate nodes, b) means for differentiating the handling and continuity of the chained dialogues based on the effect of the interaction caused by said interfering telecommunication service, in the intermediate node, in response to reception of an incoming TC-dialogue request related to a TCAP based supplementary service having a dedicated SubSystem Number SSN, and based on an analysis of the requested TCAP based supplementary service identity, as identified by a specific supplementary service Object Identifier OID, and calling and called party address information sent together with the request, i) means for triggering the transparent relay functionality in case either the OID is not recognized by the intermediate node, or the called party address information does not address a subscriber connected to the intermediate node, ii) means for initiating a TC-relay link procedure comprising preservation of the received TC-dialogue ID and sending of a query for number translation by communicating the called and calling party address information and the supplementary service ASE of the received TC-dialogue to the interfering telecommunication service, iii) means for analysing the received query and determining by the interfering telecommunication service the new called party address information and the effect of the interaction with the TCAP based supplementary service as identified by the received OID, iv) means for accomplishing the TC-relay link procedure comprising establishing an outgoing TC-dialogue based on the received called party address information and the supplementary service ASE from the interfering telecommunication service, and building an association between the incoming and the outgoing TC-dialogues ID based on a received indication for handling of the TC-dialogue continuity.

19. A system according to claim 18, comprising means for performing steps i) and ii) by an Application Distribution Logic Entity ADLE and a first SACF that receives the TC-dialogue and transfers it to said ADLE for further handling.

20. A system according to claim 19, comprising means for establishing said new TC-relay link by the ADLE entity ordering said first SACF to establish a new association by requesting assistance of a second SACF via an MACF.

21. A system according to claim 19, comprising, in the ADLE, means for preserving incoming transaction ID and Signalling Connection Control Part SCCP Global Title GT addresses, means for forming a message identifying the service addressed and the initiator of the request, means for establishing whether a current protocol used for communication supports TC-relay signalling, and, if supported, means for packing the incoming SCCP GT addresses, OID and ASE package into a relay request operation and sending the operation to the application in the intermediate node to be handled therein to form a suitable relay response to ADLE, if not supported, means for sending an appropriate operation under the current protocol to the application in the intermediate node to be handled therein so as to return a new appropriate operation under the current protocol to ADLE.

22. A system according to claim 21, comprising in the application, in response to the reception of the operation under the current protocol, means for identifying the addressed service application, means for performing the requested action, or interaction, and generating a new SCCP GT address, means for sending the appropriate new operation under the current protocol.

23. A system according to claim 22, comprising in the ADLE, in response to receipt therein of the operation under the current protocol, means for generating an outgoing transaction ID, means for preserving outgoing transaction ID & SCCP GT addresses, means for generating a new TC-begin from the ASE received in the operation, means for compiling the SCCP GT addresses, means for sending the TC-begin to the destination remote entity.

24. A system according to claim 21, comprising in the application, in response to the reception of the relay request operation, means for unpacking the SCCP GT addresses, OID and ASE package, means for identifying the addressed service application, means for performing the requested action, or interaction, and generating a new SCCP GT address, means for sending a relay response operation to the ADLE, said response operation in the case of a multiple association being preceded by generation of a new ASE, indication of relevant OID and packing of these into the relay response operation before sending.

25. A system according to claim 24, comprising in the ADLE, in response to receipt therein of the relay reponse from the application, and in case of a single association, means for unpacking the received SCCP GT addresses, OID and ASE package from the relay response operation, means for generating an outgoing transaction ID, means for preserving outgoing transaction ID & SCCP GT addresses, means for generating a new TC-begin from the received ASE, means for compiling the SCCP GT addresses, means for sending the TC-begin to the destination remote entity.

26. A system according to claim 24, comprising in the ADLE, in response to receipt therein of the relay reponse from the application, and in case of a multiple association, means for generating a link to the new ASE via MACF, means for preserving the MACF link and the SCCP GT addresses, means for generating a new TC-begin from the received ASE and compiling the SCCP GT addresses, means for sending a-TC-begin to destination remote entity.

27. A system according to claim 21, comprising at the intermediate node for the continuation of the established TC-relay link until the TC-dialogue transaction between the originating and the terminating entities has been ended, and in response to reception in the ADLE of any TC-primitive with SSN="supplementary service" expect for TC-begin, and in case transaction ID does not exist in the ADLE, means for terminating the TC-dialogue and sending message to addressed ASE as identified by the OID.

28. A system according to claim 21, comprising, at the intermediate node for the continuation of the established TC-relay link until the TC-dialogue transaction between the originating and the terminating entities has been ended, and in response to reception in the ADLE of any TC-primitive with SSN="supplementary service" expect for TC-begin, and in case transaction ID exists in the ADLE , TC-relay shall be sent via MACF, and triggering of the service has been requested, means for sending incoming ASE to application for generation of new ASE, means for receiving new ASE from application, means for compiling TC operation with the relay transaction ID and address, means for sending relay TC operation to originating or terminating remote entity.

29. A system according to claim 21, comprising, at the intermediate node for the continuation of the established TC-relay link until the TC-dialogue transaction between the originating and the terminating entities has been ended, and in response to reception in the ADLE of any TC-primitive with SSN="supplementary service" expect for TC-begin, and in case transaction ID exists in the ADLE, TC-relay shall be sent via MACF, but triggering of the service has not been requested, means for compiling TC-operation with the relay transaction ID and address, means for sending relay TC-operation to originating or terminating remote entity.

30. A system according to claim 21, comprising, at the intermediate node for the continuation of the established TC-relay link until the TC-dialogue transaction between the originating and the terminating entities has been ended, and in response to reception in the ADLE of any TC primitive with SSN="supplementary service" expect for TC-begin, and in case transaction ID exists in the ADLE, but TC-relay shall not be sent via MACF, means for compiling TC-operation with the relay transaction ID and address, means for sending relay TC operation to originating or terminating remote entity.

31. A system in a telecommunication network, in which a subscriber connected to an originating local exchange node has requested activation of a supplementary service located in an application of said originating node, wherein said supplementary service uses a Transaction Capability Application Part TCAP and a corresponding Abstract Service Element ASE for establishing an end-to-end Transaction Capability TC-dialogue, having a transaction ID, with the corresponding supplementary service in an application of a destination local exchange node to which an addressed remote subscriber is connected, and said TC-dialogue terminates the request on an interfering telecommunication service located in an application of an intermediate node, the system for enabling a network operator to prevent service operation failure when there is an interaction between said end-to-end TCAP based supplementary service and said interfering telecommunication service, the system comprising:

a) means for establishing a relay link between an incoming TC-dialogue and an outgoing TC-dialogue at the intermediate node for providing a chain of end-to-end TC-dialogues between the originating local exchange node and the destination local exchange node, while using a transparent relay functionality being independent of utilizing TCAP based supplementary service ASEs at intermediate nodes, b) means for differentiating the handling and continuity of the chained dialogues based on the effect of the interaction caused by said interfering telecommunication service, and means for providing, for handling and continuity of the chained dialogues, an indication by the interfering telecommunication service on whether the TC-link relay functionality should use a Single Association Control Function SACF to establish a simple and single association between the incoming and the outgoing TC-dialogues, or a Multiple Association Control Function MACF to establish a multiple association using two SACFs between the incoming and the outgoing TC-dialogues.

32. A system according to claim 31, comprising means for deciding use of a SACF association when the TCAP based supplementary service ASE used in the outgoing TC-dialogue is identical to the TCAP based supplementary service ASE received by the incoming TC-dialogue, and for deciding use of a MACF association when the TCAP based supplementary service ASE used in the outgoing TC-dialogue is not identical to the TCAP based supplementary service ASE received by the incoming TC-dialogue.

* * * * *